Figure 1:
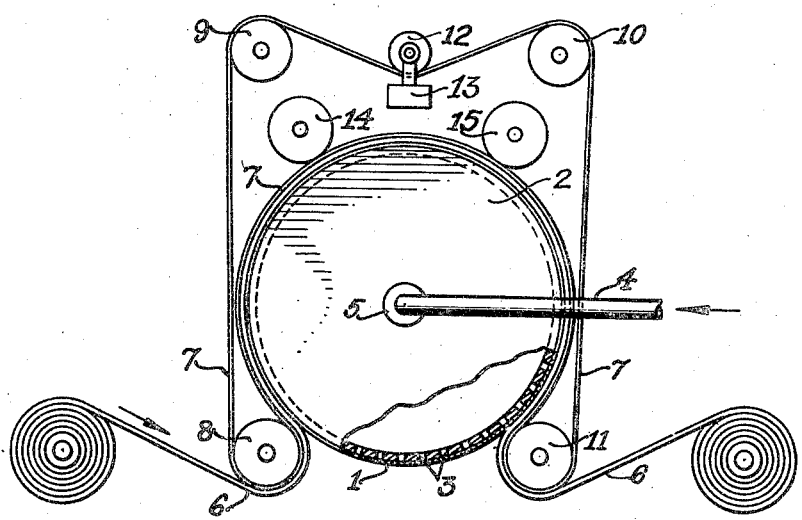

Nov. 18, 1947.  C. S. FRANCIS, JR  2,430,868

PROCESS FOR TREATING FIBROUS MATERIALS

Filed Aug. 3, 1942

INVENTOR.
CARLETON S. FRANCIS, JR.
BY Howson & Howson
ATTORNEYS

Patented Nov. 18, 1947

2,430,868

UNITED STATES PATENT OFFICE 2,430,868

PROCESS FOR TREATING FIBROUS MATERIALS

Carleton S. Francis, Jr., Chestnut Hill, Pa., assignor, by mesne assignments, to American Viscose Corporation, Wilmington, Del., a corporation of Delaware Application August 3, 1942, Serial No. 453,454

3 Claims. (Cl. 154—33)

This invention relates to fibrous structures and in particular to a process of preparing felts and to the products so produced. This application is a continuation-in-part of my co-pending U. S. application Serial No. 300,876, filed October 23, 1939, which is a continuation-in-part of U. S. application Serial No. 157,018, filed August 2, 1937, now U. S. Patent No. 2,253,000.

In the prior patent and co-pending application above-identified, I have disclosed for the first time novel felts comprising thermoplastic fibres and a process of treating such felts to activate the thermoplastic fibres to bind fibres in the product. It is possible within the scope of the inventions described and claimed in said prior patent and application to produce a wide variety of felted structures. However, in some cases it is desirable to produce felts which are extremely soft and of low density and relatively thick. It has been found that when an attempt is made to produce felts comprising thermoplastic fibres while activating such fibres by pressing the felt between heated plates, it is difficult to produce felts which are soft, light in weight and of substantial thickness. The upper temperature used in activating the fibres is limited by that temperature at which any of the fibres in the product may be damaged. Accordingly it has been proposed to lower the temperature while increasing the pressure during the activation but such increase in pressure tends to glaze the surface, renders the product non-porous, reduced the thickness, and increases the stiffness. When an attempt is made to produce a soft and relatively thick felt, by giving the felt a prolonged treatment at high temperature and low pressure, the heat insulating properties of the felt prevents a uniform activation of the thermoplastic fibres, and such process is expensive and time consuming.

Accordingly, it is the general object of the present invention to provide a process for the production of felts containing thermoplastic fibres in which the activation of the thermoplastic fibres is substantially uniform throughout the body of the felt.

It is a further object of the invention to provide a process for producing felts which are relatively soft, light in weight and of substantial thickness.

It is another object to provide an apparatus for activating felts containing thermoplastic fibres without substantially reducing the porosity and without glazing the surface of the felt while activating the thermoplastic fibres in a uniform manner.

It is a further object to provide an apparatus for rapidly and uniformly activating thermoplastic fibres in felts containing such fibres.

Other objects of the invention will in part be obvious and will in part appear hereinafter.

According to the present invention a layer of intermingled fibres which layer consists solely of or contains thermosplastic fibres, is subjected to the action of steam having a temperature sufficient to activate the thermoplastic fibres with or without subjecting the felt to substantial pressure. In another embodiment of the process the layer of fibres is confined between porous members and steam is caused to pass through the felt while so confined. The invention contemplates however, that during the treatment with steam the felt may be subjected to substantial pressure to get a felt having the required density and stiffness. The apparatus of the invention comprises in general, the combination of, porous means adapted and arranged to confine a layer of fibres comprising potentially adhesive fibres and means for passing steam through the layer of fibres while so confined.

It is to be understood that when the term "activate" is used with respect to the treatment of thermoplastic fibres, it includes any effect resulting from heating the thermoplastic fibres such as shrinking, softening, distorting, coalescing and melting such fibres. Generally speaking, with increase in temperature, and/or pressure and/or time, the effect produced changes in the order just mentioned. In the practice of the present invention the time, temperature and pressure are so correlated with each other that the product of these factors is always as low as possible. That is, if the time is increased, the temperature and pressure may be reduced while if the temperature is increased the time and pressure may be reduced. Similarly, when the pressure is increased, the time and temperature may be slightly reduced.

The invention accordingly comprises a process having the steps and relation of steps one to another, and an apparatus having the elements and the relation of elements one to another, as exemplified in the following detailed description and the scope or application of which will be indicated in the appended claims.

Figure 2:
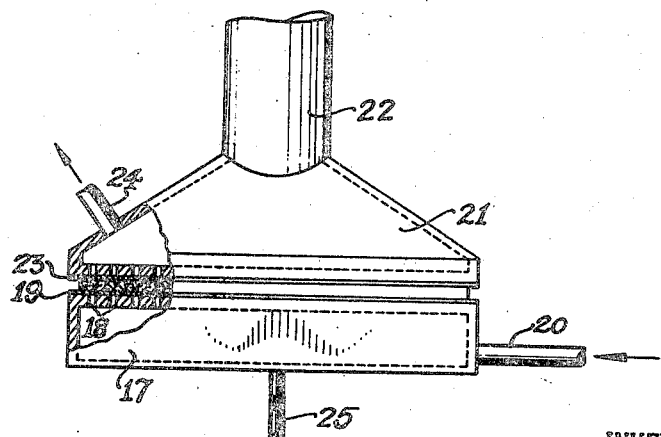

For a more complete understanding of the nature and objects of the present invention, reference should be had to the accompanying drawing in which Fig. 1 is a diagrammatical representation, in side elevation of one embodiment of the apparatus for carrying out the present process in a continuous manner; and Fig. 2 is a side elevation of a second embodiment of the apparatus of the invention for treating felt structures in a batch operation.

Thus, the present invention enables improved shaped felts to be made from various natural or synthetic fibres and filaments. Among the natural fibres which may be used are wood pulp fibres, cotton, flax, jute, kapok and silk, or they may be synthetic fibres of cellulosic composition, such as a cellulose hydrate; cellulose derivatives; natural and synthetic rubber and derivatives thereof; alginic acid; gelatine, casein; and mineral fibres such, for example, as spun glass, asbestos, mineral wood and the like; and fibres made of natural and synthetic resins which are not rendered tacky when the potentially adhesive resin fibres are rendered tacky by heating; also, fibres and filaments made by slitting, cutting or shredding non-fibrous films, such as waste Cellophane.

The thermoplastic fibre may be composed of a wide variety of materials, and may comprise any thermoplastic cellulose derivative such, for example, as cellulose esters, cellulose ethers, cellulose ester-ethers and mixed esters and mixed ethers of cellulose; also any synthetic resinous material capable of being formed into fibres which have an inherent tackiness upon heating to a temperature below that at which the nonfelting fibres are damaged or rendered tacky and which are non-tacky at room temperature such, for example, as the resins formed by the polymerization of various organic compounds such as coumarone, indene hydrocarbons, vinyl, styrene, sterols, aldehydes, furfural, ketones, urea, thiourea, phenol-aldehyde resins, urea-aldehyde resins, amine-aldehyde resins, sulfonamide-aldehyde resins, polyhydric alcohol-polybasic acid resins, drying oil-modified alkyd resins, resins formed from acrylic acid, its homologues and their derivatives, sulfur-olefine resins, polyamide resins (nylon type), fibres formed from synthetic or artificial rubber such, for example, as polymerized butadiene, olefine-polysulfides, iso-butylene polymers, chloroprene polymers and plasticized polyvinyl halides, and vinylidene chloride. I prefer to use fibres formed from a resin comprising the product of co-polymerizing two or more resins such, for example, as co-polymers of vinyl halide and vinyl acetate, co-polymers of vinyl halide and an acrylic acid derivative, co-polymers of vinyl compound and styrol compound; and also fibres formed from a mixture of vinyl resins and acrylic acid resins or methacrylic acid resins, a mixture of polyolefine resins and phenol-aldehyde resins, or a mixture of two or more resins from the different classes just named, also fibres formed from mixtures of thermoplastic cellulose derivatives and resins.

I prefer to use for the thermoplastic fibres, fibres which have been formed from a resinous material selected from the group consisting of mixtures of and co-polymers of resins since such mixtures and co-polymers permit one to vary widely and in any desired manner such essential properties of the fibres as flexibility, toughness, thermosoftening point and extruding charactertistics, whereas when fibres are formed from a single resin it is difficult, and in many cases impossible, to vary these properties and characteristics in the desired manner.

The resins above mentioned may be classified as:

(a) Heat non-convertible resins such, for example, as glycol polybasic acid resins, vinyl resins and the acid type phenol-aldehyde resins, and the like.

(b) Heat convertible resins such, for example, as a glycerol polybasic acid resin, polyolefine resins, phenol-aldehyde resins and the like.

(c) An element-convertible resin (which becomes infusible through the action of certain elements, such as oxygen and sulfur) such, for example, as glycerol-polybasic acid-drying oil resins, and olefine sulfur resins.

For felts that are subjected to laundering or dry cleaning, the thermoplastic fibre should be insoluble in water and inert to the detergents used for laundering and dry cleaning. The resins employed are preferably those which do not soften appreciably at temperatures reached in laundering and "blocking" (as in the making of hat felts), although softening during blocking is not objectionable.

In the now preferred embodiment there is used synthetic resin fibre comprising a co-polymer of vinyl acetate and vinyl chloride which fibres are made by suitable methods known in the art. This fibre resembles rayon and is similar thereto in many respects, but it differs therefrom since it becomes tacky when heated to a temperature of from 200° F. to 350° F. When heated, it becomes adhesive to other fibres in contact with it and adheres thereto upon cooling. It is tough and firm at ordinary temperatures, insoluble in water, and inert to the agents used in laundering and dry cleaning, and shows no substantial decrease in tensile strength on being wetted.

The resinous materials may be formed into fibres either by extrusion through spinnerettes in the conventional manner as used in the manufacture of rayon, nylon and the like, or by melting the resinous material or dissolving it in a volatile organic material and then spraying the molten mass or solution in a fluid, preferably into a gaseous atmosphere in such manner as to cause the resinous material to be deposited in the form of a multiplicity of fibres as described and claimed in my copending U. S. application, Serial No. 381,292, filed March 1, 1941.

The ratio of thermoplastic fibre to other fibre may also vary widely depending on the properties of the two types of fibres and may be regulated to suit the purpose for which the felt is destined, but in general a minor proportion, preferably from 3 per cent to 45 per cent, usually from 3 per cent to twenty per cent, of the thermoplastic fibre will be employed. Where a greater degree of strength or a closer bonding of the component fibres is desired, the percentage will be relatively high, whereas in soft felts, and in papers of certain construction where it is desirable to have a comparatively small amount of bonding of the component fibres, the percentage will be relatively small.

The thermoplastic fibre and the other fibre are mixed by a method suitable to the production of a particular type of felt. For example, in the making of textile felts, the fibres may be mixed by carding, and in the manufacture of paper felts, by beating the fibres together in a suitable liquid or by adding the potentially adhesive fibres to the other fibres at any time prior to sheeting the fibres.

Alternatively, the fibrous layer may be formed by associating the potentially adhesive fibres, concurrently with their formation, with the non-adhesive fibres as by dispersing these fibres into a fluid, preferably into a gaseous atmosphere and permitting the fibres to settle in a commingled condition in the form of a layer as described and claimed in my copending U. S. application, Serial No. 381,292, filed March 1, 1941.

The mixture of fibres may be felted in a predetermined shape by blowing them in or on a suitable mold, or the felt may be shaped and given a desired form. The shaping takes place in the case of paper felts, preferably by molding or shaping the set paper sheet. In the case of textile felts, it is preferable to shape the felt layer after its initial formation and after the thermal activation of the potentially adhesive fibres and while such fibres are in an adhesive condition. The predetermined shape of both paper and textile felts may be permanently set by the deactivation of the adhesive or of the adhesive fibres.

The thermoplastic fibres are activated by the use of steam and preferably under confining or moderate pressure. The temperature of the steam treatment will depend on the properties of the thermoplastic fibre and must necessarily be below that at which the felt is damaged. When the felt is cooled, the thermoplastic material becomes non-tacky and tough, and binds fibres in the product, thus providing a felt which possesses increased strength and greater tenacity between component fibres.

The tackiness of the thermoplastic fibres may be modified by heating the resin fibres in the presence of a suitable plasticizer depending on the particular type of fibre. The plasticizer may be incorporated in the fibres at any point prior to heating. In the preferred embodiment the plasticizer is incorporated in the thermoplastic mass prior to its formation into fibres and filaments. The plasticizer lowers the temperature at which the resin fibres are rendered tacky upon heating. After heating, the plasticizer is preferably removed by suitable means.

In carrying out the process in a continuous manner there may be used an apparatus as illustrated in Fig. 1 comprising in combination a pair of porous webs which are adapted to confine a felt layer therebetween and means to pass steam through the webs and felt layer. In that embodiment shown in Fig. 1 one of the webs I is a porous felt or fabric which forms a continuous covering on a rotatable drum 2, the surface of which is provided with a multiplicity of perforations 3 the drum being provided with steam through inlet pipe 4 which passes through the journal 5. The cylinder may be rotated by suitable driving means (not shown). The felt 6 to be treated is held against the web I by a second web 7 which is an endless belt of porous felt or fabric passing about the rolls 8, 9, 10 and 11, tension being maintained on this web by suitable means such as the roll 12 and weight 13. The web 7 may be driven by friction against the moving felt 6 or it may be positively driven. If additional pressure on the felt 6 be required, there may be provided one or more pressure rolls 14 and 15 disposed to rotate in contact with the web 7 and press it against the drum 2. The rolls 8, 9 and 14 and 15 are preferably driven and synchronized with the surface speed of the drum 2.

In operation of the apparatus shown in Fig. 1 the layer of felt 6 passes continuously between the webs I and 7 and while passing over the drum 2 is subjected to steam with or without substantial pressure whereby the thermoplastic fibres in the felt 6 are activated. By varying the speed of the webs I and 7, the temperature of the steam and the pressure exerted on the felt, any desired activation is obtainable.

In treating felts in the piece or in making shaped felts a batch operation may be desirable. In this case there may be used an apparatus comprising, in combination, co-acting porous platens, means to press felt therebetween and means to pass steam through the felt which is held between the platens. In that embodiment shown in Fig. 2 the apparatus comprises a fixed hollow platen 17 the top surface of which is provided with a multiplicity of perforations 18 and preferably covered with a layer 19 of porous felt or fabric. Steam is admitted to the interior of the platen 17 by means of the pipe 20. The top platen 21 is hollow and fixed to the lower end of a cylinder 22 which may be reciprocated vertically by suitable conventional means (not shown). The lower surface of the platen 21 is also provided with perforations and preferably covered with a layer 23 of porous felt or fabric. While steam may be admitted through a pipe to the interior of the platen 21, in general, this is not necessary. However, an exhaust pipe 24 communicating with the interior of this platen may be used to allow the steam to escape or to enable suction to be applied, thus promoting the flow of steam through a felt 6 disposed between the platens. The pipe 25 may be used to draw off any water which condenses inside the platen 17. In operation, the platens are separated, the felt 6 inserted and the platens brought together to confine or to press the felt. Steam heated to a sufficient temperature is then admitted to the platen 17 under pressure while suction is exerted on the exhaust pipe 24 so as to force the steam through the felt 6, whereby the thermoplastic fibres in the felt are activated.

It is therefore understood that the present invention is also applicable for the treatment of intermingled fibres which are not flat but are shaped or molded in some desired form. Thus, the present invention may be used for activating thermoplastic fibres in hat felts while the hat body is confined between perforated molds through which steam is passed. Other shapes, such as, hollow, tubular bodies adapted to be used as insulation on pipes may likewise be treated by the present invention.

By way of illustration but not by way of limiting the invention, there will be given the following specific example:

A battery separator is made of thermoplastic resin fibres alone by carding fibres formed of a copolymer of vinyl acetate and vinyl chloride having a thermotacking point of about 80° C. and the carded web so produced, is subjected to a light pressure in a platen press of the type shown in Fig. 2 and the felt subjected to the action of steam under 40 pounds pressure for a period of time up to 10 seconds, whereupon, the resin fibres shrink and become slightly fused to each other. It is to be understood that the elements of time, temperature and pressure can be varied widely depending upon the density and the degree of activation desired. The product of this invention is free of surface glaze, highly porous and shows a high ionic flow when subjected to a test in a storage battery.

By the present invention it is possible to produce felts which are more uniformly activated throughout the mass and which are softer, of lower density than felts produced when the thermoplastic fibres are activated by the use of heated plates or heated pressure rolls which are only efficient under high pressures.

Thus, it is possible to produce, by the present process, felts which are extremely porous and fluffy and which are unglazed on the surface.

The products produced by the present process have characteristics which enable them to be used in a wide variety of new fields such, for example, as battery separators in which high porous, uniform freedom from glaze is required; also as thick insulating felts in which softness, low density, and uniformity of fibre binding are desired; soft, flexible felts for use in the padding of clothing and in shoe inner soles where resilience and high flexibility are desirable.

While the process and apparatus of the present invention are particularly advantageous for use in connection with the treatment of felts, as hereinabove described, they are also applicable for the treatment of other fibrous structures, such as woven, knitted and similar fabrics comprising non-thermoplastic fibres and thermoplastic fibres or filaments, such ase the fabrics described in Patents Nos. 2,253,000 and 2,266,631, and those produced by using yarns described in application Serial No. 402,812, filed July 17, 1941.

I claim:

1. A process of forming a thick, low-density textile felt comprising confining a thick layer of dry, loose, intermingled fibers comprising thermoplastic fibers between porous members without subjecting the layer to substantial pressure and passing steam through the layer of fibers while so confined, the steam having a temperature sufficient to activate said thermoplastic fibers to bind fibers in said felt without destroying the fibrous character of said thermoplastic fibers.

2. A process of forming a thick, low-density textile felt comprising carding together a dry mixture of non-thermoplastic textile fibers and thermoplastic textile fibers, forming said mixture of fibers into a thick continuous layer, and continuously passing said layer while dry between porous members which confine said layer without subjecting said layer to substantial pressure and passing steam through the layer of fibers while so confined, the steam having a temperature sufficient to activate said thermoplastic fibers to bind fibers in said felt without destroying the fibrous character of said thermoplastic fibers.

3. A process of forming a thick, low-density textile felt comprising associating thermoplastic fibers concurrently with their formation with non-thermoplastic fibers by dispersing each of such fibers in a gaseous atmosphere, allowing the fibers to deposit simultaneously from a common atmosphere until a thick layer is formed, confining said layer of dry, loose, intermingled fibers between porous members without subjecting the layer to substantial pressure, and passing steam through the layer of fibers while so confined, the steam having a temperature sufficient to activate said thermoplastic fibers to bind fibers in said felt without destroying the fibrous character of said thermoplastic fibers.

CARLETON S. FRANCIS, JR.

REFERENCES CITED

The following references are of record in the file of this patent:

UNITED STATES PATENTS

| Number | Name | Date |
| --- | --- | --- |
| 906,044 | Malcolm | Dec. 8, 1908 |
| 1,718,573 | Millspaugh | June 25, 1929 |
| 1,899,056 | Powell | Feb. 28, 1933 |
| 2,181,043 | Boeddinghaus | Nov. 21, 1939 |
| 2,277,049 | Reed | Mar. 24, 1942 |